US011059428B1

(12) United States Patent
Weil (10) Patent No.: US 11,059,428 B1
(45) Date of Patent: Jul. 13, 2021

(54) BIKE RACK ATTACHED TO VEHICLE (71) Applicant: Margaret Weil, Chester Springs, PA (US)

(72) Inventor: Margaret Weil, Chester Springs, PA (US)

(*) Notice: Subject to any disclaimer, the term of this patent is extended or adjusted under 35 U.S.C. 154(b) by 0 days.

(21) Appl. No.: 15/863,961

(22) Filed: Jan. 7, 2018

(51) Int. Cl.
B60R 9/10 (2006.01)
B60R 9/045 (2006.01)
B60R 9/06 (2006.01)

(52) U.S. Cl.
CPC ............... B60R 9/10 (2013.01); B60R 9/045 (2013.01); B60R 9/06 (2013.01)

(58) Field of Classification Search
CPC .. B60R 9/10; B60R 9/12; B60R 9/045; B60R 9/06; B60R 9/08; B60R 9/052; B60R 9/04; B60R 9/00
See application file for complete search history.

(56) References Cited

U.S. PATENT DOCUMENTS

| | | | | |
|---|---|---|---|---|
| 4,406,384 A * | 9/1983 | Schantz | ..................... | B60R 9/06 224/329 |
| 5,520,315 A | 5/1996 | Graham | | |
| 5,772,048 A * | 6/1998 | Sopcisak | .................. | B62H 3/00 211/196 |
| 6,286,738 B1 * | 9/2001 | Robins | ....................... | B60R 9/06 224/314 |
| 6,386,407 B1 | 5/2002 | Erickson et al. | | |
| 6,644,525 B1 * | 11/2003 | Allen | ......................... | B60R 9/06 224/282 |
| 6,715,652 B2 * | 4/2004 | Kmita | ..................... | B60R 9/042 224/310 |
| 6,736,301 B1 | 5/2004 | Huang | | |
| 6,772,927 B2 | 8/2004 | Bogoslofski | | |
| 8,636,184 B2 | 1/2014 | Allen et al. | | |
| 9,108,574 B1 | 8/2015 | Shen | | |
| 2006/0032880 A1 | 2/2006 | Settelmayer | | |
| 2006/0060623 A1 | 3/2006 | Huang | | |
| 2007/0057001 A1 * | 3/2007 | Wang | ......................... | B60R 9/06 224/536 |
| 2007/0102464 A1 * | 5/2007 | Garoffolo | ............... | B60R 9/042 224/310 |
| 2007/0235487 A1 * | 10/2007 | Bogoslofski | .............. | B60R 9/06 224/533 |
| 2009/0321488 A1 | 12/2009 | Sautter et al. | | |
| 2012/0298707 A1 | 11/2012 | Sautter et al. | | |
| 2014/0209647 A1 | 7/2014 | Deguile et al. | | |
| 2014/0263513 A1 * | 9/2014 | Anton | ........................ | B60R 9/06 224/522 |

(Continued)

Primary Examiner — Derek J Battisti
(74) Attorney, Agent, or Firm — Muskin and Farmer LLC (57) ABSTRACT A bicycle rack that allows for easy installation and removable onto a vehicle and also easy loading and unloading of bicycle(s). A vertical arm contains a plurality of mounting pins each of which is configured to receive a mounting coupler. A mounting coupler wraps around a bicycle (for example around the bicycle top tube) and secures the bicycle to the mounting coupler via Velcro. The mounting coupler is then inserted onto one of the plurality of mounting pins which holds the bicycle onto the bicycle rack. The bicycle rack can hold numerous bicycles in this manner. In order to remove a bicycle, the mounting coupler can be released from its respective mounting pin.

19 Claims, 11 Drawing Sheets

(56) References Cited

U.S. PATENT DOCUMENTS

| | | | |
|---|---|---|---|
| 2015/0083769 A1* | 3/2015 | Williams | B60R 9/10 224/488 |
| 2015/0210223 A1 | 7/2015 | Nusbaum | |
| 2016/0339851 A1 | 11/2016 | Nelson | |

* cited by examiner

BIKE RACK ATTACHED TO VEHICLE

BACKGROUND OF THE INVENTION

Field of the Invention

The present general inventive concept is directed to a method and apparatus directed to a bike rack attached to a vehicle.

Description of the Related Art

Bicycle Racks mounted in vehicles can be cumbersome to load and unload bicycles onto them.

What is needed is a bicycle rack that can easily attach to a vehicle that enables easy loading and unloading of bicycles.

SUMMARY OF THE INVENTION

It is an aspect of the present invention to provide an improved bicycle rack.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

The general inventive concept relates to an improve bicycle rack which enables easy installation onto a vehicle and easy attaching/removal of bicycles to the bicycle rack. The bicycle rack itself is removably attachable to a vehicle (the rear/hatchback door and the top of the vehicle). The bicycle rack removably attaches to a standard vehicle roof rack bar which is present on many vehicles.

Figure 1A:
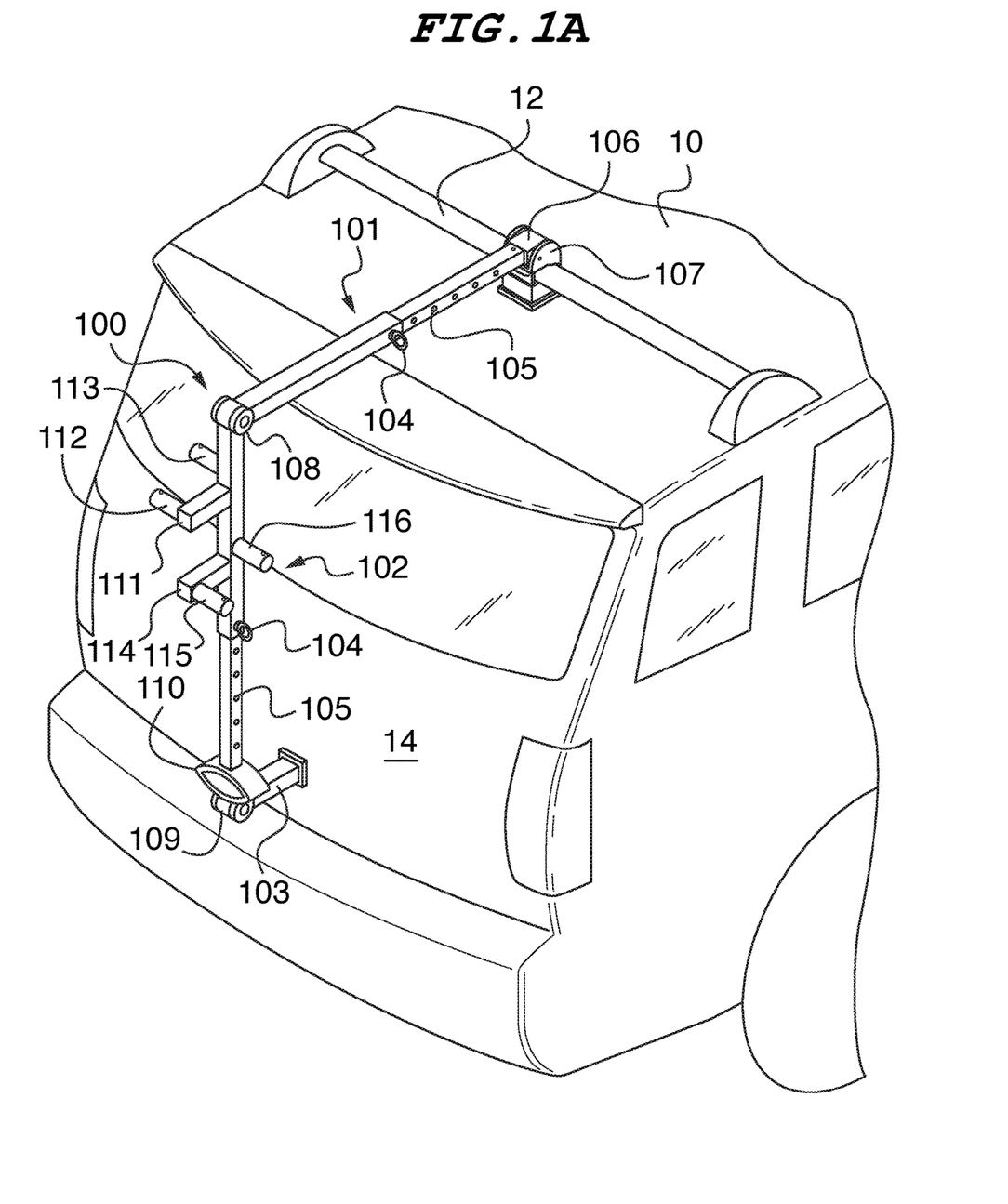
FIG. 1A is a drawing of a bike rack, according to an embodiment.

FIG. 1A is a drawing of a bike rack, according to an embodiment.

A car 10 has a car roof rack 12 and a car hatchback door 14. The bicycle rack 100 attaches to the car roof rack 12 and the car hatchback door 14. A top/horizontal arm 101 is used to connect the bicycle rack to the car roof rack 12 by attaching to an attachment base 107. The car roof rack 12 is a permanent fixture that comes already attached to the car 10 (it is mounted to the car 10 by two side mounts on each side of the car roof rack 12). The top/horizontal arm 101 comprises two interlocking sections, a first interlocking section comprises pin receiving holes 105, and the second interlocking section comprises a hole at the end with a connector pin 104 going through its hole and a hole in the first interlocking section. In this manner, a length of the top/horizontal arm 101 can be adjusted to the proper length while the connector pin 104 is removed and when the proper size is found the connector pin 104 can be inserted through the hole in the second interlocking section and the corresponding hole in the first interlocking section. A rack connector head 106 at the end of the top/horizontal arm 101 hooks onto the attachment base 107.

A vertical arm 102 connects to the top/horizontal arm 101 via a top hinge 108 which allows the vertical arm 102 to rotate (and pivot) about the top/horizontal arm 101 (and vice versa). The vertical arm 102 attaches to (and can rotate and pivot about) a lower/horizontal arm 103 via a bottom hinge 109 (and vice-versa, that is the lower/horizontal arm 103 can rotate/pivot about the vertical arm 102) via the bottom hinge 109. The lower/horizontal arm 103 attaches to the hatchback door 14. A shock absorber 110 can be attached between the vertical arm 102 and the bottom hinge 109. The shock absorber 110 (e.g., can contain a spring or other energy reducing apparatus) can help reduce the force exerted on the vertical arm 102 (and hence any bicycles that it may be carrying) from forces exerted on it by virtue of the vehicle being driven. The vertical arm 102 comprises two interlocking sections (with receiving holes 105 and a connector pin 103 as illustrated) so that the length of the vertical arm 102 is adjustable in the same manner as the top/horizontal arm 101.

The vertical arm 102 attaches to a top rear bicycle mount extension bar 111 which attaches to a top rear bicycle mounting pin 112 for mounting a bicycle. The vertical arm 102 also attaches to a bottom rear bicycle mount extension bar 114 which attaches to a bottom read bicycle mounting pin 115 for mounting another bicycle. The vertical arm also attaches to a top front bicycle mounting pin 113 and a bottom front bicycle mounting pin 116.

Figure 1B:
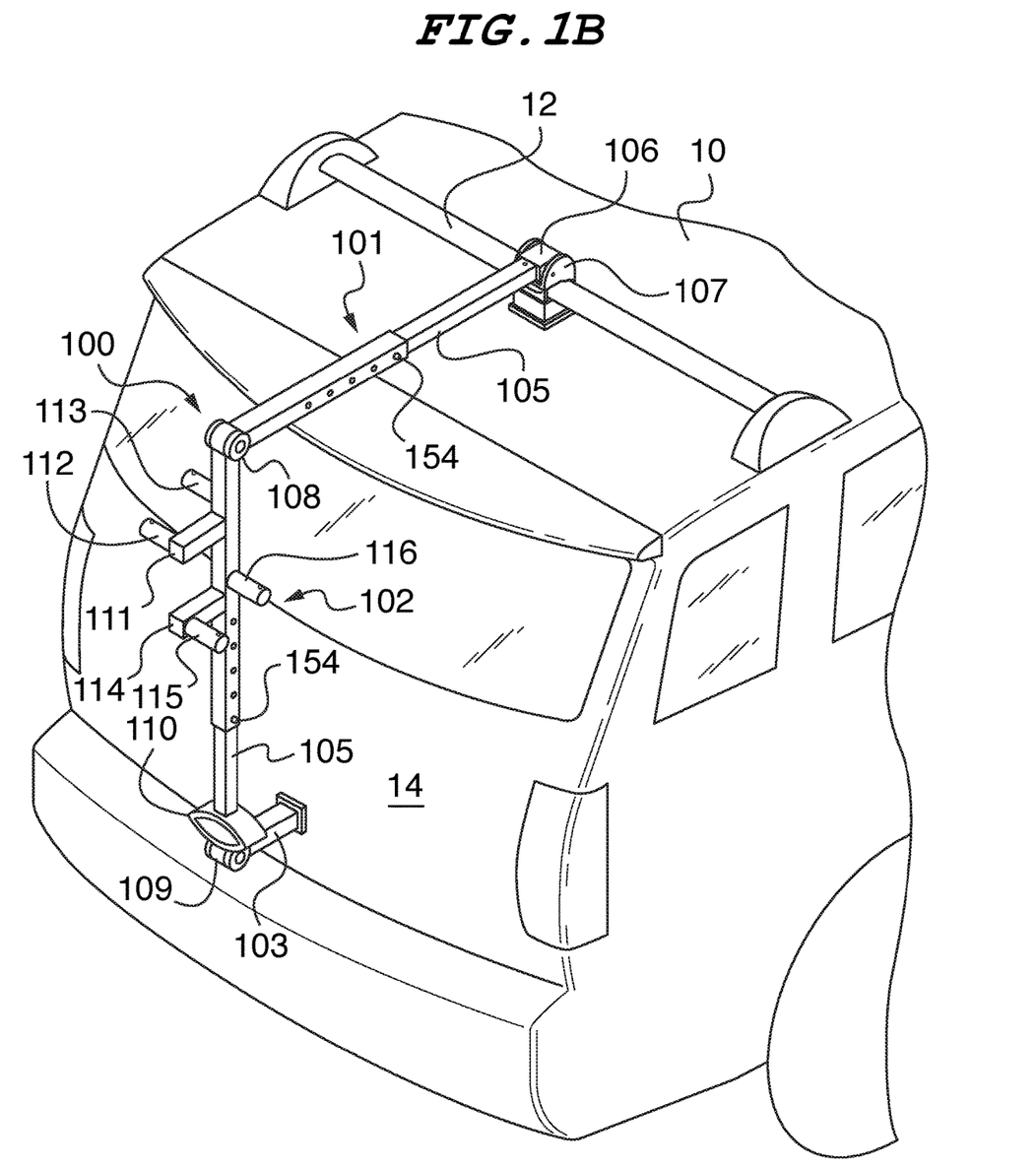
FIG. 1B is a drawing of a bike rack with an expanding pin in the arms, according to an embodiment.

FIG. 1B is a drawing of a bike rack with an expanding pin in the arms, according to an embodiment;

FIG. 1A showed the top/horizontal arm 101 and the vertical arm 102 with a removable connector pin 104. FIG. 1B shows an alternative embodiment which instead of a removable connector pin 104, utilizes an expanding pin 154 in the innermost interlocking section. The expanding pin 154 uses a spring which naturally pushes apart each end of the pin. The pin can be pressed (retracted) by pressing each end of the pin towards each other. In this way, the pin can fit into any of the holes in the outermost interlocking section. This operates similarly to the embodiment shown in FIG. 1A but there is no removable connector pin 104 which can get lost. Instead the expanding pin 154 is built into and permanently affixed to the innermost interlocking section. To operate this embodiment, the expanding pin 154 would be retracted (by pressing in each end of the expanding pin 154) and then the outermost interlocking section would be slid until the proper hole is over the expanding pin 154 and then the expanding pin 154 would naturally extend into that hole, locking the outermost section and the innermost section of either arm together. If the expanding pin 154 expands into a hole that the user does not want to use, the expanding pin 154 can be pressed together to retract it and the outermost section can continue to be slid until the proper hole out of the holes 105 locks around the expanding pin 154.

Figure 2:
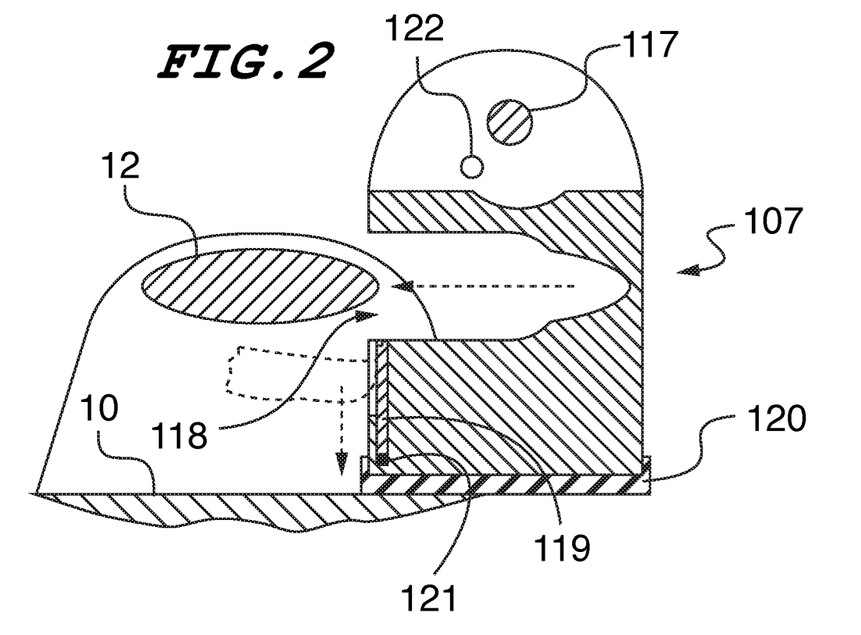
FIG. 2 is a drawing of a car roof rack being attached to an attachment base, according to an embodiment.

FIG. 2 is a drawing of a car roof rack being attached to an attachment base, according to an embodiment.

The attachment base 107 is removable from the car 10 and in order to attach it to the car 10 is slid on to the car roof rack 12 (which is permanently attached to the car 10). The attachment base 107 rests on a rubber cushion attachment base 120 which abuts the car 10. A sliding door 119 opens and closes to enable access to an opening for car rack installation 118 in the attachment base 107. A spring 121 naturally presses the sliding door 119 closed (in an upward direction) and the sliding door 119 can be manually pressed down in order to slide the attachment base 107 onto the car roof rack 12. A rack head detent receiver 122 is present and is used to lock onto the rack connector head 106. A rack head attachment bar 117 is what the rack connector head 106 will latch onto.

Figure 3:
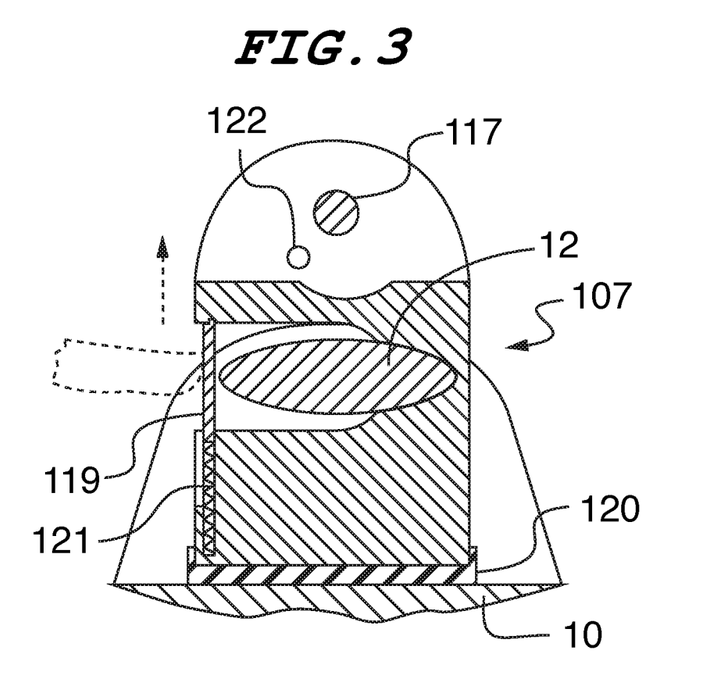
FIG. 3 is a drawing of a car rood rack attached to the attachment base, according to an embodiment.

FIG. 3 is a drawing of a car rood rack attached to the attachment base, according to an embodiment.

The user will slide the attachment base onto the roof rack 12 (from behind the roof rack 12). Note that the sliding door 119 is in the closed (up) position by virtue of the spring 121 pressing the sliding door 119 into the closed position. Since the sliding door 119 is in the closed position, the attachment base 107 should not be able to slide off of the roof rack 12.

Figure 4:
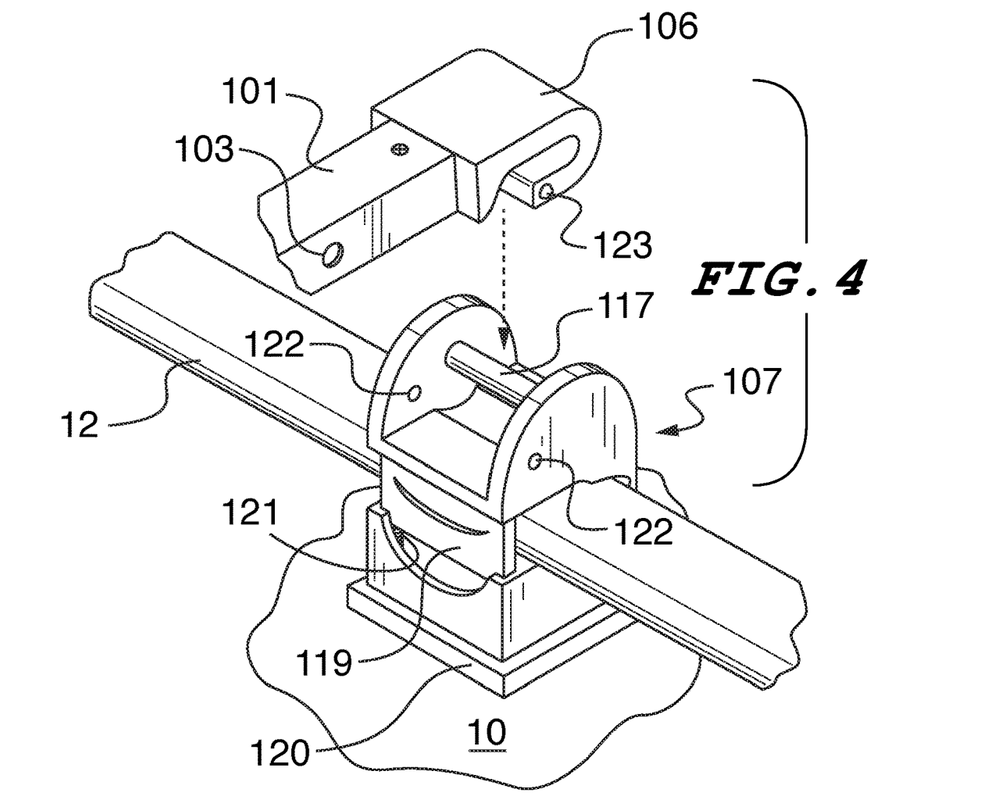
FIG. 4 is a drawing of a top arm being attached to the attachment base, according to an embodiment.

FIG. 4 is a drawing of a top arm being attached to the attachment base, according to an embodiment.

The rack connector head 106 (at an end of the top/horizontal arm 101) latches onto the rack head attachment bar 117. A pair of rack head locking detents 123 are present on each end of the rack connector head 106. In the attachment base 107 are a pair of rack head detent receivers 122 (holes) which are configured to accept the rack head locking detents 123.

Figure 5:
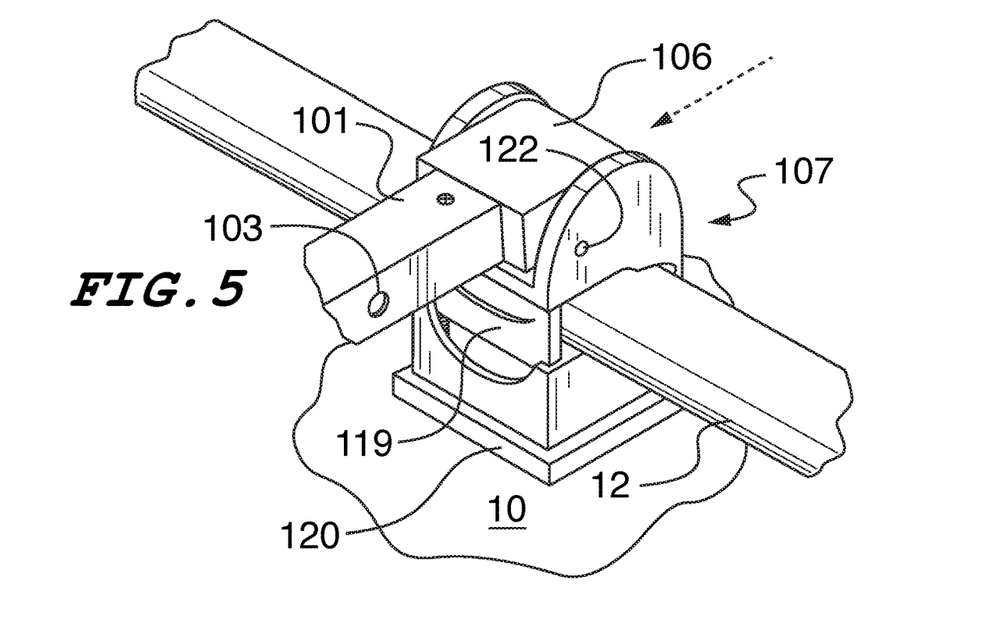
FIG. 5 is a drawing of the top arm attached to the attachment base, according to an embodiment.

FIG. 5 is a drawing of the top arm attached to the attachment base, according to an embodiment.

Note that the rack connector head 106 is now attached (latched onto) the rack head attachment bar 117. The pair of rack head locking detents 123 are now fit into the pair of rack head detent receivers 122. The pair of rack head locking detents 123 can optionally be made from a deformable (but hard) material such as hard plastic that would allow them to compress a little in order to fit into the rack head detent receivers 122. Note that the motion in order to attach the rack connector head 106 onto the rack head attachment bar 117 is first a downward vertical motion (so that the rack connector head 106 rests on the rack head attachment bar 117) and then a rearward horizontal motion (so that the pair of rack head locking detents 123 are locked into the rack head detent receivers 122). Once the rack connector head 106 is locked (latched) onto the rack head attachment bar 117, it would typically not come off unless manually removed by a human.

Figure 6:
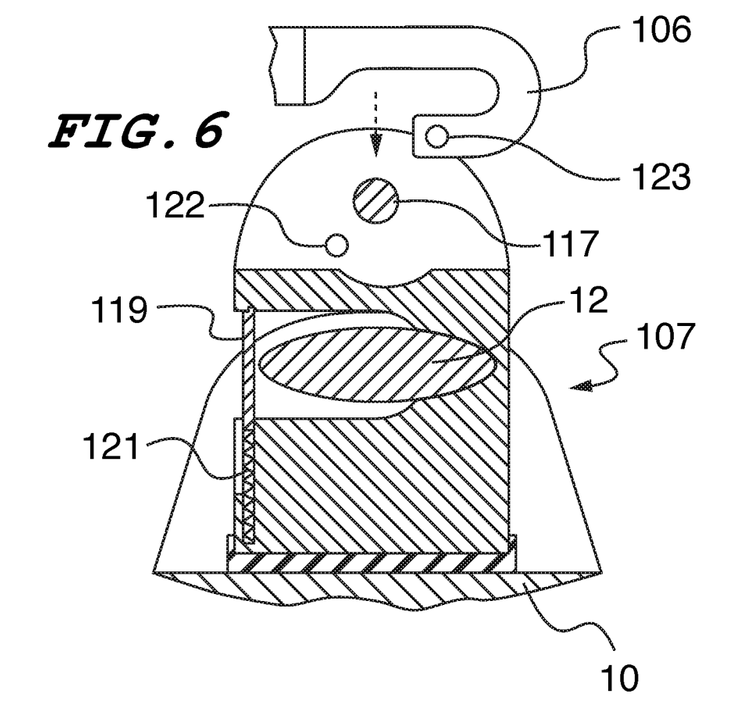
FIG. 6 is a side view drawing of a rack connector head being lowered onto a rack head attachment bar, according to an embodiment.

FIG. 6 is a side view drawing of a rack connector head being lowered onto a rack head attachment bar, according to an embodiment.

The rack connector head 106 is being lowered onto the rack head attachment bar 117 by a user.

Figure 7:
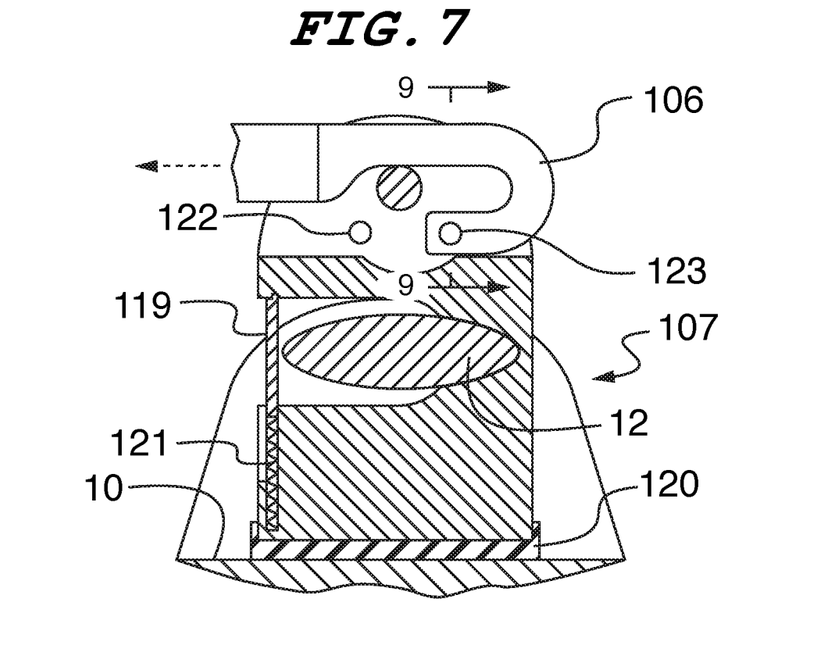
FIG. 7 is a side view drawing of the rack connector head being horizontally moved onto the rack head attachment bar, according to an embodiment.

FIG. 7 is a side view drawing of the rack connector head being horizontally moved onto the rack head attachment bar, according to an embodiment.

The rack connector head 106 is now being pulled back onto the rack head attachment bar 117 by a user. The pair of rack head locking detents 123 are now vertically aligned with their corresponding rack head detent receivers 122.

Figure 8:
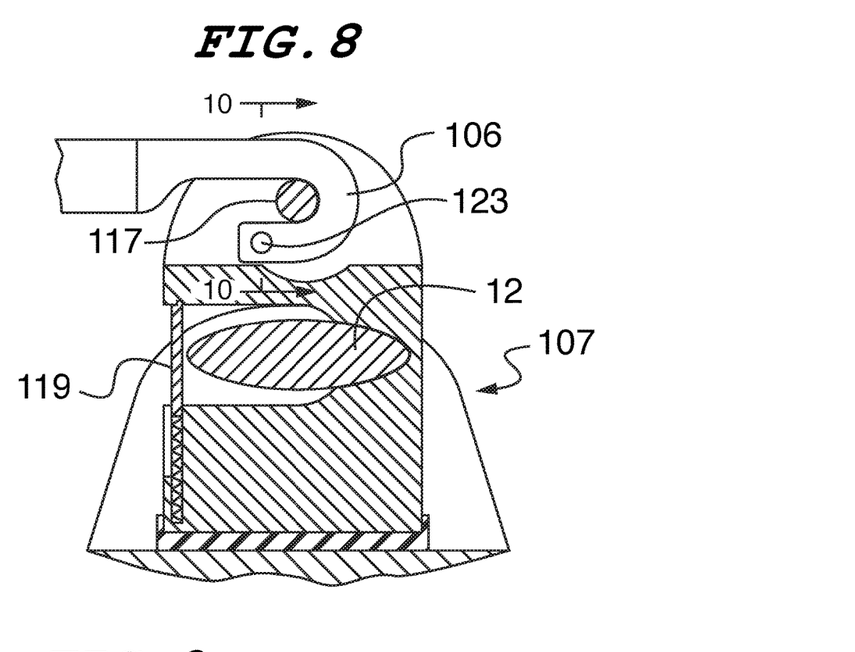
FIG. 8 is a drawing of the rack connector head attached to the rack head attachment bar, according to an embodiment.

FIG. 8 is a drawing of the rack connector head attached to the rack head attachment bar, according to an embodiment.

The rack connector head 106 is now pulled back all the way and is locked onto the rack head attachment bar 117 with the pair of rack head locking detents 123 inserted into the rack head detent receivers 122.

Figures 9, 10:
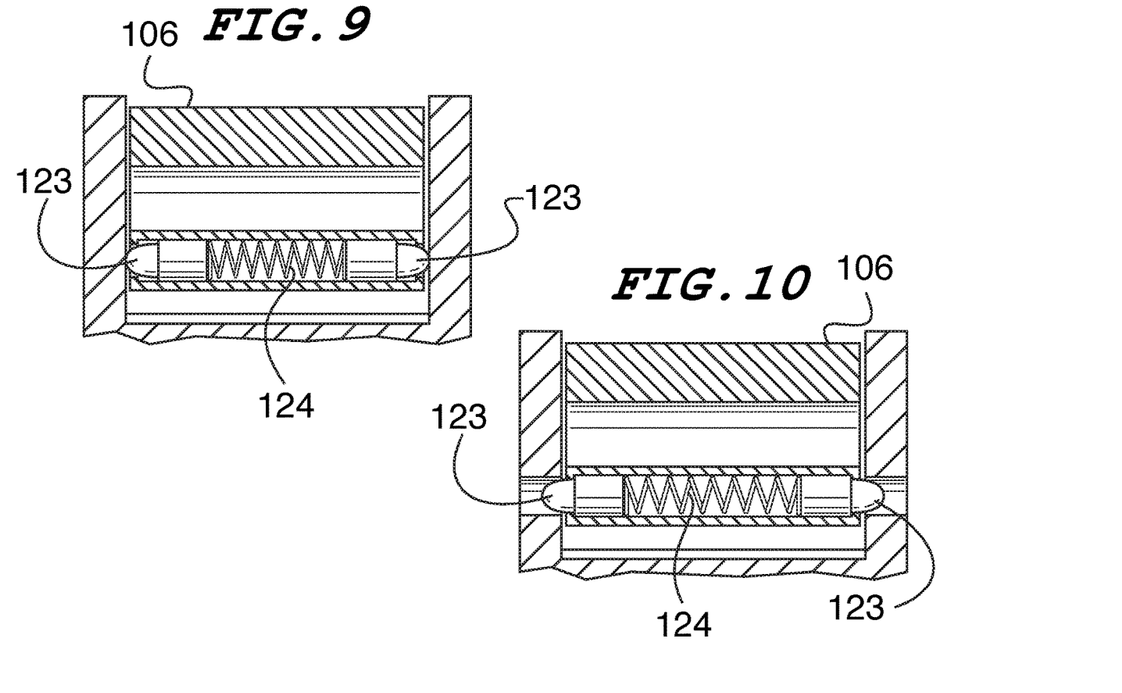
FIG. 9 is a drawing of a cross section of the attachment base looking into the view shown in FIG. 7, according to an embodiment.
FIG. 10 is a drawing of a cross section of the attachment base looking into the view shown in FIG. 8, according to an embodiment.

FIG. 9 is a drawing of a cross section of the attachment base looking into the view shown in FIG. 7, according to an embodiment.

Note that the pair of rack head locking detents 123 are being pushed outward by a detent spring 124 which is inside the rack connector head 106.

FIG. 10 is a drawing of a cross section of the attachment base looking into the view shown in FIG. 8, according to an embodiment.

Note that the pair of rack head locking detents 123 are extended into the corresponding rack head detent receivers 122 because the detent spring 124 pushes both rack head locking detents 123 outward and into the corresponding rack head detent receivers 122. The rack connector head 106 is now securely locked onto the rack head attachment bar 117, although it can be removed by a human user.

Figures 11, 12:
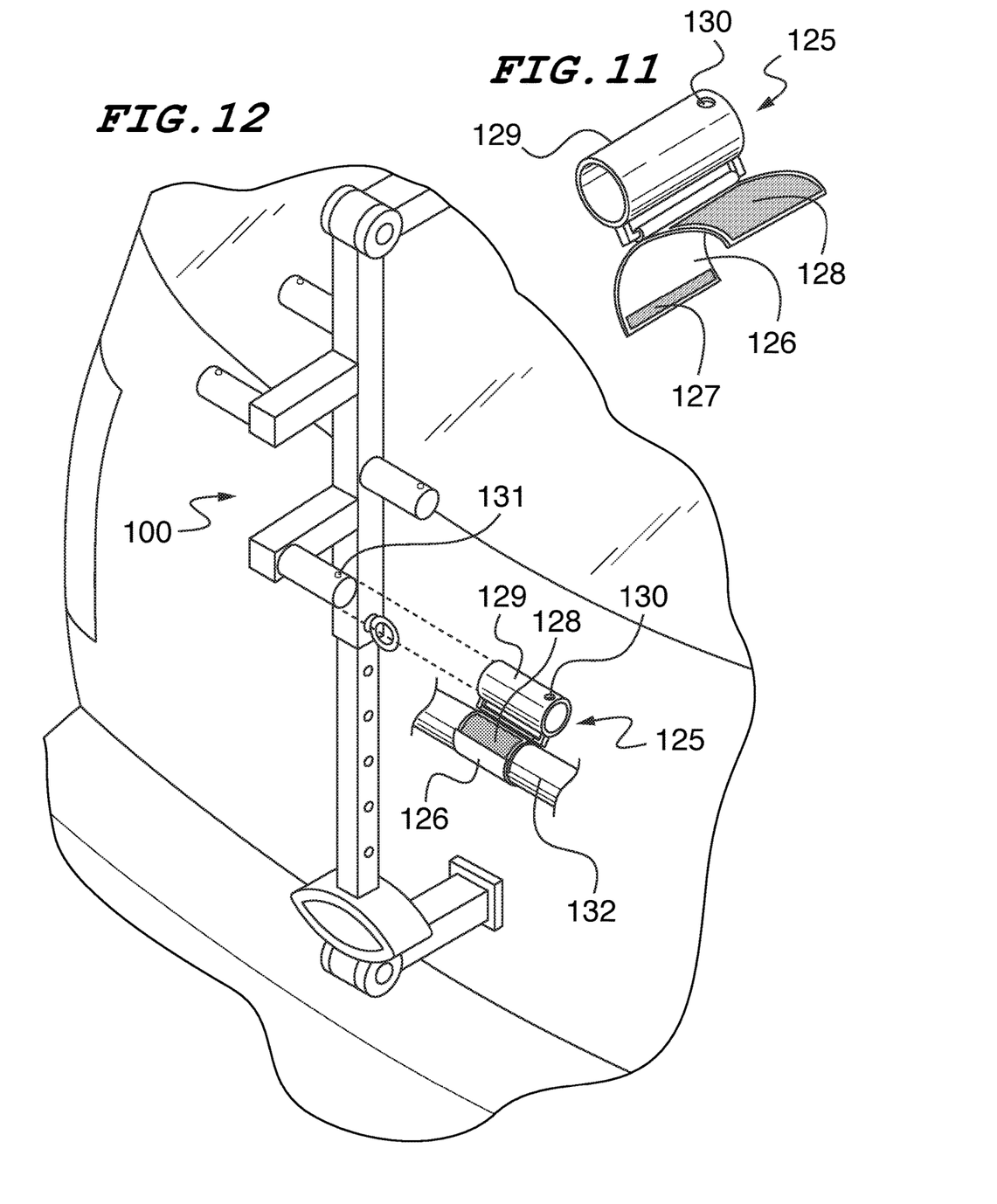
FIG. 11 is a drawing of a mounting coupler, according to an embodiment.
FIG. 12 is a drawing of the mounting coupler being attached to the bicycle rack, according to an embodiment.

FIG. 11 is a drawing of a mounting coupler, according to an embodiment.

A mounting coupler 125 attaches both onto a bicycle and onto a mounting pin on the bicycle rack 100, thereby securing the bicycle onto the bicycle rack 100. A bicycle attachment strap 126 is used to tightly wrap around a frame (or top tube) of a bicycle. The bicycle attachment strap 126 has a male Velcro pad 127 and a cooperating female Velcro pad 128 in order to secure the bicycle attachment strap 126 around the frame (or top tube) of the bicycle. The mounting coupler 125 also comprises a mounting sleeve 129 which mounts onto a mounting pin on the bicycle rack 100. The mounting sleeve 128 has a locking pin receiver 130 which is used to lock onto a corresponding locking pin on a mounting pin on the bicycle rack 100. Note that the mounting sleeve 129 is attached to the bicycle attachment strap 126.

FIG. 12 is a drawing of the mounting coupler being attached to the bicycle rack, according to an embodiment.

The mounting coupler 125 is attached onto a mounting pin on the bicycle rack 100 by sliding the mounting sleeve 129 onto the mounting pin. Each mounting pin on the bicycle rack 100 has a locking pin 131 which will fit into the locking pin receiver 130 on the mounting sleeve 128, thereby securing the mounting coupler 125 onto the bicycle rack 100. The locking pin 131 can be made from a hard but deformable material (such as hard plastic or other such material) that can compress a little when pressure is exerted on it, thus causing the locking pin to fit inside the locking pin receiver 130. Once the mounting sleeve 129 is fully inserted onto the mounting pin on the bicycle rack 100 and the locking pin 131 clicks into the locking pin receiver 130, then the mounting coupler 125 would not slide off the mounting pin. The mounting coupler 125 can be removed from the mounting pin by manually depressing the locking pin 131 so that the mounting sleeve 129 can then slide out (and off) of the mounting pin. A top tube 132 of a bicycle is secured into the bicycle attachment strap 126 by virtue of the both the male Velcro pad 127 and the female Velcro pad 128 wrapped and attached tightly around the top tube 132.

Note that additional mounting coupler(s) 125 can be used to attach other bicycles to all of the other mounting pins 112, 113, 115, 116. All of the mounting pins contain their own locking pin 131 so that it can attach to the respective mounting coupler has described herein.

Figure 13:
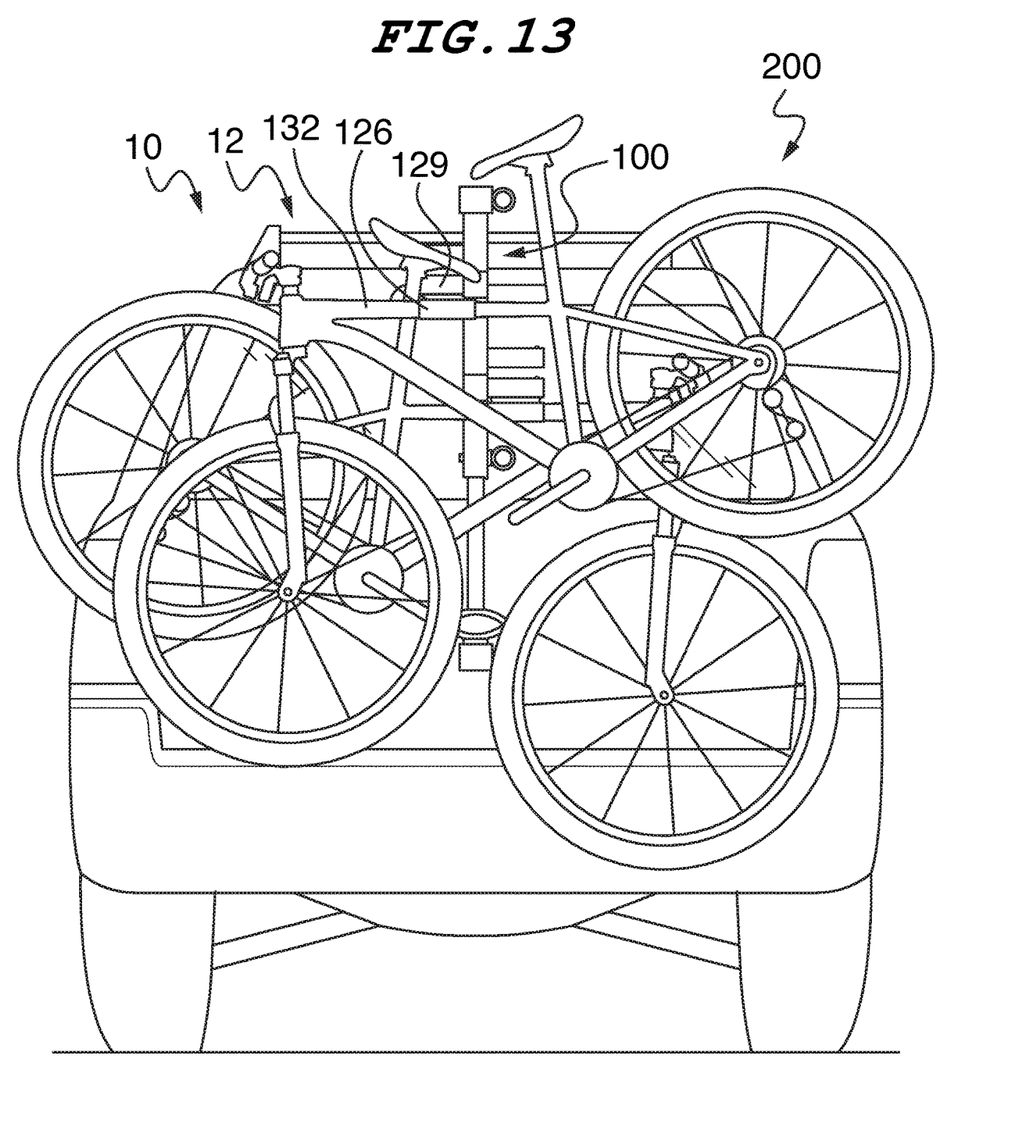
FIG. 13 is a front view drawing of the bicycle rack holding two bicycles, according to an embodiment.

FIG. 13 is a front view drawing of the bicycle rack holding two bicycles, according to an embodiment.

Note that the bicycle rack 100 is securely holding two bicycles 200. Note how the bicycle attachment strap 126 attached to the mounting sleeve 129 is securely wrapped around the top tube 132 of a bicycle, thereby securing it onto the bicycle rack. The other bicycle is also secured to the bicycle rack in the same manner.

Figure 14:
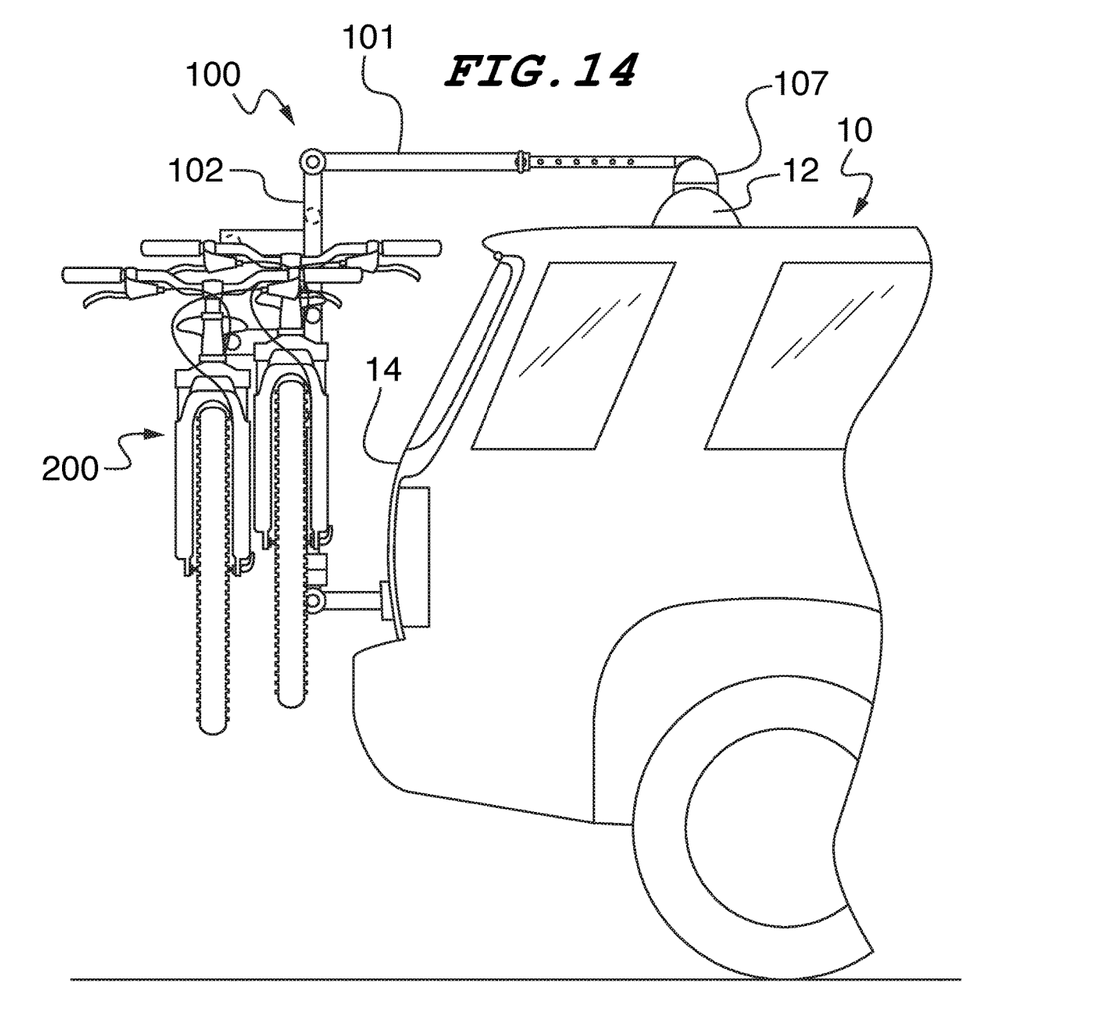
FIG. 14 is a side view drawing of the bicycle rack holding two bicycles, according to an embodiment.

FIG. 14 is a side view drawing of the bicycle rack holding two bicycles, according to an embodiment.

Note that the bicycles 200 are securely held in place by the bicycle rack 100. The bicycle rack can be configured as described herein to hold anywhere from two to six bicycles.

Figure 15:
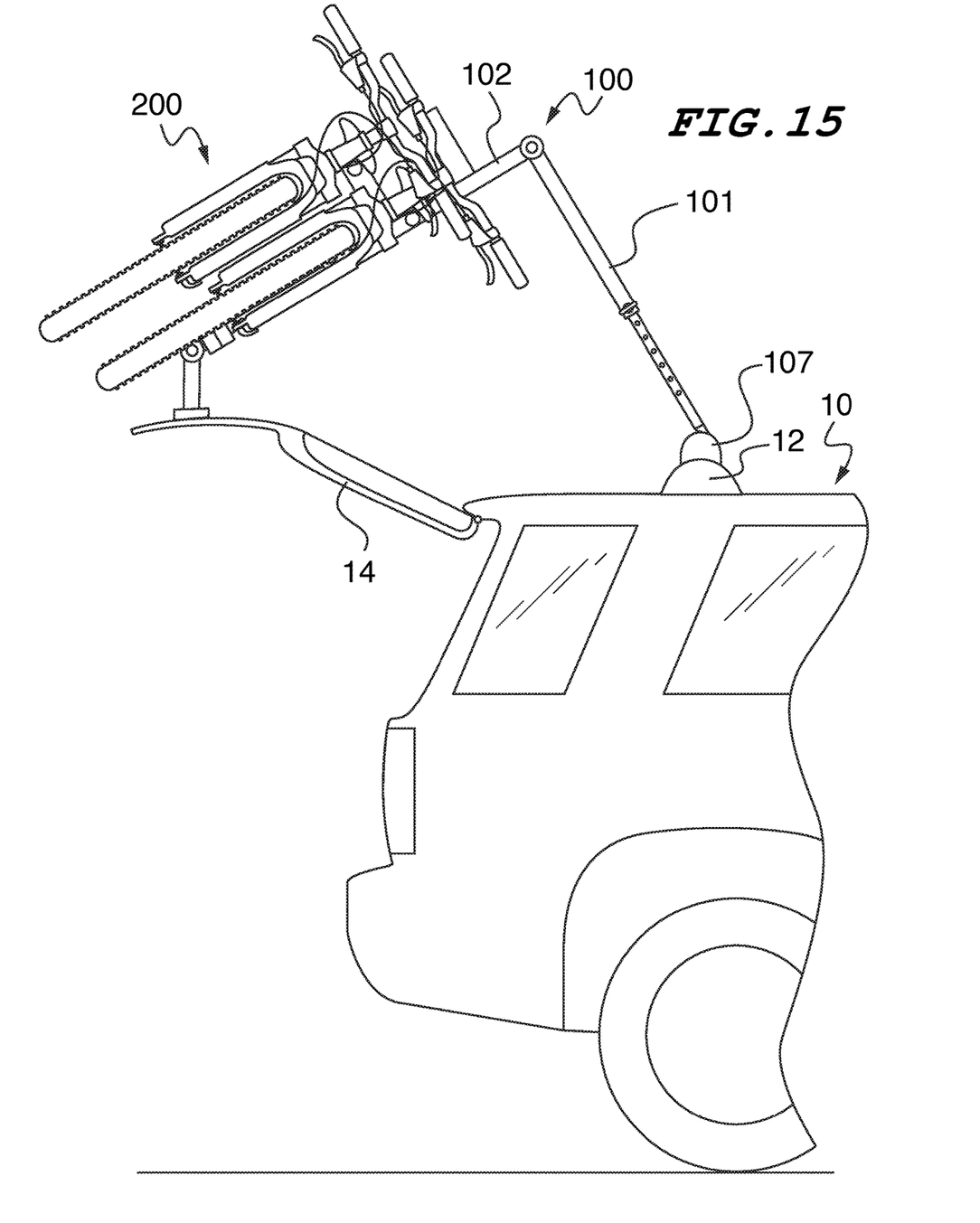
FIG. 15 is a side view drawing of the bicycle rack holding two bicycles with a car hatchback door open, according to an embodiment.

FIG. 15 is a side view drawing of the bicycle rack holding two bicycles with a car hatchback door open, according to an embodiment.

That that the hatchback door 14 can be opened which would cause the bicycles 200 to raise along with the bicycle rack 100. This can provide for convenience for the users by being able to open the hatchback 14 without having to remove the bicycles 200.

Figure 16:
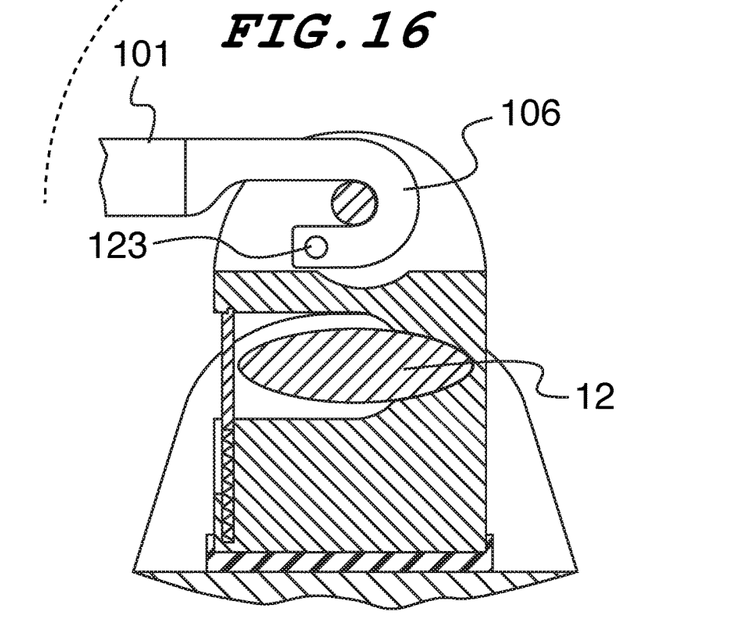
FIG. 16 is a drawing of the rack connector head attached to the rack head attachment bar, according to an embodiment.

FIG. 16 is a drawing of the rack connector head attached to the rack head attachment bar, according to an embodiment.

In order to remove the rack connector head 106, the user would twist the rack connector head 106 in a direction as shown in FIG. 16.

Figure 17:
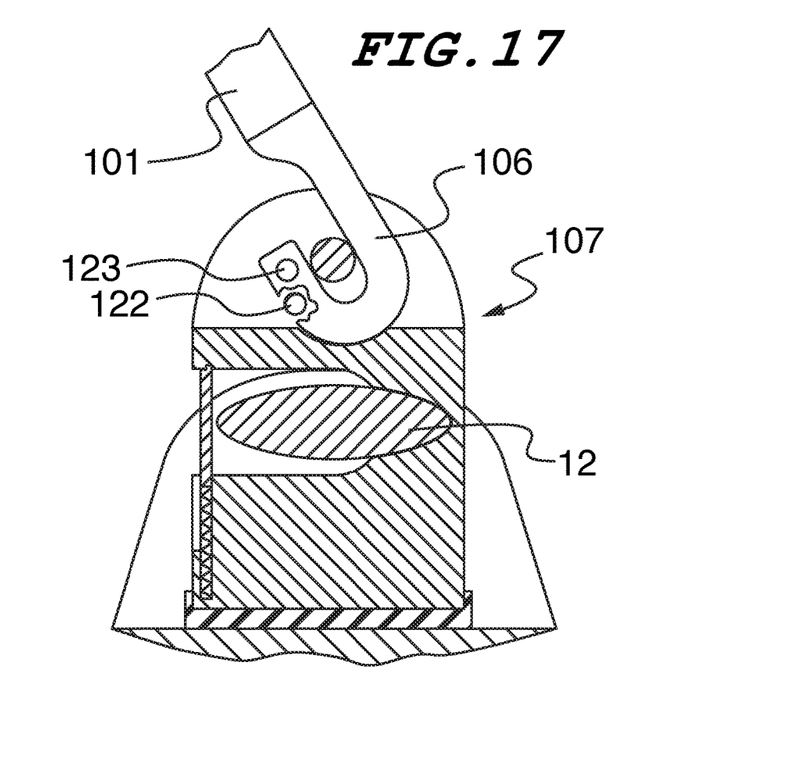
FIG. 17 is a drawing of the rack connector head being removed from the rack head attachment bar, according to an embodiment.

FIG. 17 is a drawing of the rack connector head being removed from the rack head attachment bar, according to an embodiment.

Upon twisting the rack connector head 106 in the direction shown in FIG. 16, the pair of rack head locking detents 123 can be pressed into the rack connector head 106 (against the force of the detent spring), thereby removing them from being held inside the rack head detent receivers 122. The user may wish to depress the rack head locking detents 123 through the rack head detent receivers 122 (e.g., with a tool such as a screwdriver) to also help remove the rack connector head 106 from the attachment base 107.

In the manner described, bicycles can be easily loaded and secured onto the bicycle rack 100 and the vehicle can then be driven while the bicycles remain securely attached to the bicycle rack (which itself is securely attached to the vehicle). When the users reach their destination, the bicycles can then be easily removed from the bicycle rack 100. Furthermore, the bicycle rack 100 itself can be easily attached to a vehicle and removed from the vehicle. Note that "car" as used herein can be used interchangeably with "vehicle."

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for attaching bicycles to a vehicle, the apparatus comprising:
    a vertical arm;
    a horizontal arm;
    a top hinge pivotally connecting the vertical arm to the horizontal arm;
    a lower arm connected to the vertical arm;
    a bottom hinge pivotally connecting the lower arm to the vertical arm;
    a first mounting pin attached to the vertical arm, the first mounting pin extends in a direction perpendicular to the vertical arm, wherein the direction is not parallel to a direction the horizontal arm pivots relative to the vertical arm;
    a second mounting pin attached to the vertical arm;
    a top rear bicycle mount extension bar attached to the vertical arm;
    a bottom rear bicycle mount extension bar attached to the vertical arm;
    a top rear bicycle mounting pin attached to the top rear bicycle mount extension bar;
    a bottom rear bicycle mounting pin attached to the bottom mount extension bar;
    a mounting coupler comprising a mounting sleeve and a bicycle attachment strap, wherein the mounting sleeve is configured to fit onto the first mounting pin and the second mounting pin, wherein the mounting sleeve is configured to be attachable and removable to the first mounting pin and the second mounting pin;
    a rack connector head attached to an end of the horizontal arm opposite the top hinge; and
    an attachment base configured to removably attach to the rack connector head, wherein the attachment base is configured to attach to a car roof rack.

2. The apparatus as recited in claim 1, wherein the mounting sleeve comprises a locking pin receiver and the first mounting pin comprises a first locking pin, the first locking pin configured to fit inside the locking pin receiver thereby securing the mounting sleeve onto the first mounting pin.

3. The apparatus as recited in claim 2, wherein the second mounting pin comprises a second locking pin, the second locking pin configured to fit inside the locking pin receiver thereby securing the mounting sleeve onto the second mounting pin.

4. The apparatus as recited in claim 1, wherein the vertical arm is configured to have an adjustable length via the vertical arm comprising two interlocking sections.

5. The apparatus as recited in claim 4, wherein the horizontal arm is configured to have an adjustable length via the horizontal arm comprising two interlocking sections.

6. The apparatus as recited in claim 1, wherein an end of the lower arm opposite the bottom hinge is attached to a hatchback door of a vehicle.

7. The apparatus as recited in claim 1, wherein an end of the horizontal arm opposite the top hinge is attached to a top of the vehicle.

8. The apparatus as recited in claim 6, wherein an end of the horizontal arm opposite the top hinge is attached to a top of the vehicle.

9. An apparatus for attaching bicycles to a vehicle, the apparatus comprising:
a horizontal arm comprising a first end and a second end opposite the first end of the horizontal arm;
a vertical arm comprising a first end and a second end opposite the first end of the vertical arm;
a lower arm comprising a first end and a second end opposite the first end of the lower arm;
the first end of the horizontal arm rotatably connected to the first end of the vertical arm;
the second end of the horizontal arm attached to a roof rack of a vehicle;
the second end of the vertical arm attached to a first end of the lower arm, the second end of the lower arm attached to a hatchback door of the vehicle;
the vertical arm comprising a plurality of mounting pins, wherein the plurality of mounting pins extend in a direction perpendicular to the vertical arm, wherein the direction is not parallel to the lower arm;
a top rear bicycle mount extension bar attached to the vertical arm;
a bottom rear bicycle mount extension bar attached to the vertical arm;
a top rear bicycle mounting pin attached to the top rear bicycle mount extension bar;
a bottom rear bicycle mounting pin attached to the bottom mount extension bar;
a mounting coupler comprising a mounting sleeve and a bicycle attachment strap, wherein the mounting sleeve is configured to fit onto each of the plurality of mounting pins, wherein the mounting sleeve is configured to be attachable and removable to each of the plurality of mounting pins; and
wherein, the second end of the horizontal arm is attached to the roof rack via a rack connector head which is attached to the second end of the horizontal arm, the rack connector head is attached to an attachment base, the attachment base is attached to the roof rack.

10. The apparatus as recited in claim 9, wherein the vertical arm is configured to have an adjustable length via the vertical arm comprising two interlocking sections.

11. The apparatus as recited in claim 9, wherein the horizontal arm is configured to have an adjustable length via the horizontal arm comprising two interlocking sections.

12. The apparatus as recited in claim 9, wherein the mounting coupler further comprises a mounting sleeve and a bicycle attachment strap, wherein the mounting sleeve is configured to fit onto all of the plurality of mounting pins.

13. The apparatus as recited in claim 12, wherein the mounting sleeve comprises a locking pin receiver and each of the plurality of mounting pins comprises a locking pin, the locking pin configured to fit inside the locking pin receiver thereby securing the mounting sleeve onto a respective mounting pin out of the plurality of mounting pins.

14. The apparatus as recited in claim 12, wherein the mounting sleeve is secured around a bicycle, and the mounting coupler is secured into one of the plurality of mounting pins.

15. A method of utilizing a bicycle rack, the method comprising:
providing: a horizontal arm comprising a first end and a second end opposite the first end of the horizontal arm, a vertical arm comprising a first end and a second end opposite the first end of the vertical arm, a lower arm comprising a first end and a second end opposite the first end of the lower arm, the first end of the horizontal arm rotatably connected to the first end of the vertical arm, the second end of the vertical arm attached to a first end of the lower arm, the vertical arm comprising a plurality of mounting pins, wherein the plurality of mounting pins extend in a direction perpendicular to the vertical arm, wherein the direction is not parallel to the lower arm; a top rear bicycle mount extension bar attached to the vertical arm; a bottom rear bicycle mount extension bar attached to the vertical arm; a top rear bicycle mounting pin attached to the top rear bicycle mount extension bar; a bottom rear bicycle mounting pin attached to the bottom mount extension bar; and a mounting coupler comprising a mounting sleeve and a bicycle attachment strap, wherein the mounting sleeve is configured to fit onto each of the plurality of mounting pins, wherein the mounting sleeve is configured to be attachable and removable to each of the plurality of mounting pins, wherein, the second end of the horizontal arm is attached to the roof rack via a rack connector head which is attached to the second end of the horizontal arm, the rack connector head is attached to an attachment base, the attachment base is attached to the roof rack; and
attaching the second end of the horizontal arm attached to a roof rack of a vehicle.

16. The method as recited in claim 15, further comprising attaching a bicycle to one of the plurality of mounting pins.

17. The apparatus as recited in claim 1, wherein the rack connector head comprises a pair of rack head locking detents which are configured to fit into a pair of rack head detent receivers in the attachment base.

18. The apparatus as recited in claim 9, wherein the rack connector head comprises a pair of rack head locking detents which are configured to fit into a pair of rack head detent receivers in the attachment base.

19. The method as recited in claim 15, wherein the providing further provides that the rack connector head comprises a pair of rack head locking detents which are configured to fit into a pair of rack head detent receivers in the attachment base.

* * * * *